(12) United States Patent
Kim et al.

(10) Patent No.: US 8,628,875 B2
(45) Date of Patent: Jan. 14, 2014

(54) BATTERY MODULE WITH MULTI-LEVEL CONNECTOR

(75) Inventors: Sung-Bae Kim, Jyunggi-do (KR); Yong-Sam Kim, Jyunggi-do (KR); Sang-Won Byun, Jyunggi-do (KR); Hyo-Seob Kim, Jyunggi-do (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 361 days.

(21) Appl. No.: 13/064,311

(22) Filed: Mar. 17, 2011

(65) Prior Publication Data

US 2011/0256445 A1  Oct. 20, 2011

Related U.S. Application Data

(60) Provisional application No. 61/282,888, filed on Apr. 16, 2010.

(51) Int. Cl.
*H01M 2/24* (2006.01)

(52) U.S. Cl.
USPC ............... 429/158; 429/149; 429/160

(58) Field of Classification Search
USPC ........... 429/148, 158, 160, 149; 439/284, 875
See application file for complete search history.

(56) References Cited

U.S. PATENT DOCUMENTS

| | | | |
|---|---|---|---|
| 6,844,110 B2 | 1/2005 | Enomoto et al. | |
| 2003/0134193 A1 | 7/2003 | Hanafusa et al. | |
| 2005/0100785 A1* | 5/2005 | Enomoto et al. | 429/174 |
| 2008/0063929 A1* | 3/2008 | Byun et al. | 429/121 |
| 2009/0011269 A1 | 1/2009 | Urushihara et al. | |
| 2009/0123830 A1* | 5/2009 | Kato et al. | 429/160 |
| 2009/0223940 A1 | 9/2009 | Hosoya | |
| 2011/0064993 A1 | 3/2011 | Ochi | |
| 2011/0081568 A1 | 4/2011 | Kim et al. | |
| 2012/0315807 A1 | 12/2012 | Sakae | |
| 2013/0012079 A1 | 1/2013 | Sakae et al. | |

FOREIGN PATENT DOCUMENTS

| | | |
|---|---|---|
| CN | 101218697 A | 7/2008 |
| EP | 2339670 A1 | 6/2011 |
| JP | 2002-151045 A | 5/2002 |
| JP | 2002-358945 A | 12/2002 |
| JP | 2006-261083 A | 9/2006 |

(Continued)

OTHER PUBLICATIONS

European Search Report in EP 11162561.2-1227, dated Jul. 22, 2011 (Kim, et al.).

(Continued)

*Primary Examiner* — Zachary Best
(74) *Attorney, Agent, or Firm* — Lee & Morse, P.C.

(57) ABSTRACT

An embodiment is directed to a battery module, including a first battery having a first terminal, the first terminal including a first metal, a second battery having a second terminal, the second terminal including a second metal different from the first metal, and a connecting member electrically connecting the first terminal to the second terminal, the connecting member having a first portion and a second portion, a face of the first portion being joined to a face of the second portion, a nugget zone being disposed where the face of the first portion meets the face of the second portion, the first portion including a third metal, the second portion including a fourth metal, and the fourth metal being different from the third metal.

24 Claims, 5 Drawing Sheets

(56) References Cited

FOREIGN PATENT DOCUMENTS

| | | |
|---|---|---|
| JP | 2008-123800 A | 5/2008 |
| JP | 2008-186725 A | 8/2008 |
| JP | 2011-210480 A | 10/2011 |
| JP | 2011-210481 A | 10/2011 |
| JP | 2011-210482 A | 10/2011 |
| KR | 10-2003-0060814 A | 7/2003 |
| KR | 10 2008-0089501 A | 10/2008 |
| WO | WO 2006/016441 A1 | 2/2006 |

OTHER PUBLICATIONS

Korean Office Action in KR 10-2011-0034877, dated Aug. 14, 2012 (Kim, et al.).

Japanese Office Action in JP 2011-091334, dated Feb. 5, 2013 (Kim, et al.).

Korean Notice of Allowance in KR 10-2011-0034877, dated Feb. 22, 2013 (Kim, et al.).

Chinese Office Action dated May 29, 2013.

* cited by examiner

BATTERY MODULE WITH MULTI-LEVEL CONNECTOR

CROSS-REFERENCE TO RELATED APPLICATION

This application claims priority to U.S. Provisional Application No. 61/282,888, filed in the U.S. Patent and Trademark Office on Apr. 16, 2010, and entitled "Battery Module," which is incorporated by reference herein in its entirety and for all purposes.

BACKGROUND

1. Field

Embodiments relate to a battery module.

2. Description of the Related Art

Rechargeable batteries can be easily charged and discharged, unlike primary batteries. Small capacity rechargeable batteries are used for small portable electronic devices such as mobile phones, laptop computers, and camcorders, while large capacity batteries are widely used as power sources for driving motors of hybrid vehicles, etc.

SUMMARY

An embodiment is directed to a battery module, including a first battery having a first terminal, the first terminal including a first metal, a second battery having a second terminal, the second terminal including a second metal different from the first metal, and a connecting member electrically connecting the first terminal to the second terminal, the connecting member having a first portion and a second portion, a face of the first portion being joined to a face of the second portion, a nugget zone being disposed where the face of the first portion meets the face of the second portion, the first portion including a third metal, the second portion including a fourth metal, and the fourth metal being different from the third metal.

The face of the first portion and the face of the second portion may be joined together with a friction stir weld.

The face of the first portion and the face of the second portion may extend in a thickness direction of the connecting member.

The face of the first portion and the face of the second portion may be joined in a butt joint.

A weld zone may be present where the first and second portions are joined together, the weld zone including the nugget zone, a thermo-mechanically affected zone, and a heat affected zone.

The weld zone may be a spot.

The weld zone may be linear.

The first portion may be fixed to the first terminal, the first metal may be aluminum or an aluminum alloy, the second metal may be copper or a copper alloy, the third metal may be aluminum or an aluminum alloy, and the fourth metal may be copper or a copper alloy.

The first portion may be welded to the first terminal.

The first portion may be attached to the first terminal with a fixing member.

The fixing member may be a nut.

The first portion may include a first terminal connector, a first middle step, and a first weld protrusion, the first middle step being between the first terminal connector and the first weld protrusion. The second portion may include a second terminal connector, a second middle step, and a second weld protrusion, the second middle step being between the second terminal connector and the second weld protrusion. The first weld protrusion and the second weld protrusion may be joined together.

The first middle step may have a thickness greater than that of the first weld protrusion and less than that of the first terminal connector, and the second middle step may have a thickness greater than that of the second weld protrusion and less than that of the second terminal connector.

The first terminal connector may be welded to the first terminal.

The first terminal connector may have a first hole penetrating therethrough, the second terminal connector may have a second hole penetrating therethrough, the first terminal may protrude through the first hole, and the first terminal connector may be attached to the first terminal with a fixing member.

The fixing member may be a nut.

Another embodiment is directed to a vehicle, including a power source, the power source providing a motive power for the vehicle, and a battery module configured to provide electricity to the power source. The battery module may include a first battery having a first terminal, the first terminal including a first metal, a second battery having a second terminal, the second terminal including a second metal different from the first metal, and a connecting member electrically connecting the first terminal to the second terminal, the connecting member having a first portion and a second portion, a face of the first portion being joined to a face of the second portion, a nugget zone being disposed where the face of the first portion meets the face of the second portion, the first portion including a third metal, the second portion including a fourth metal, and the fourth metal being different from the third metal.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
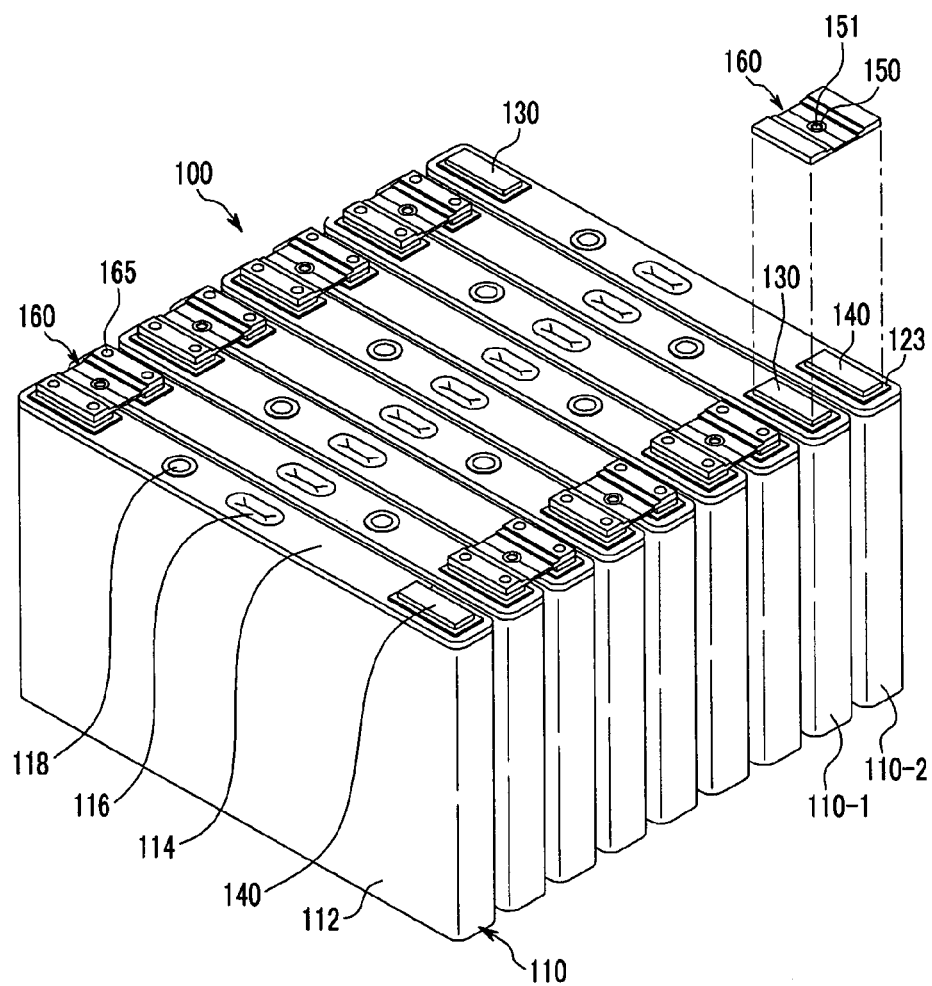
FIG. 1 illustrates a perspective view showing a battery module according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
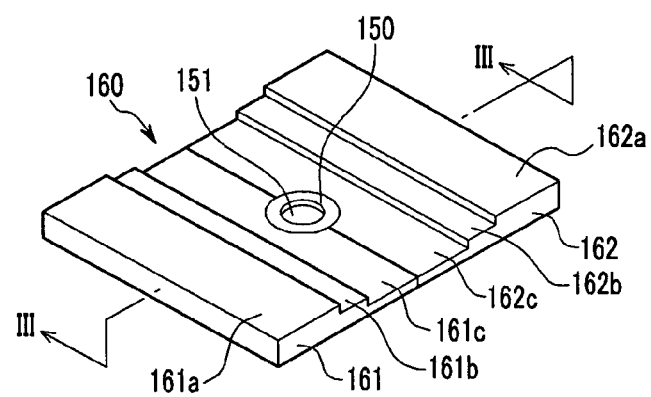
FIG. 2 illustrates a perspective view of a connecting member according to the first example embodiment.

FIG. 1 illustrates a perspective view showing a battery module 100 according to a first example embodiment, and FIG. 2 illustrates a perspective view of a connecting member according to the first example embodiment.

Referring to FIG. 1 and FIG. 2, the battery module 100 according to the present example embodiment may include a plurality of rechargeable batteries 110, e.g., rechargeable batteries 110-1 and 110-2 in FIG. 1. Each of the rechargeable batteries 100 may have an anode terminal 130 and a cathode terminal 140. Connecting members 160 may electrically connect the rechargeable batteries 110.

The battery module 100 according to the present example embodiment may be formed by connecting the rechargeable batteries 110 in series. In another implementation, the rechargeable batteries 110 may be connected in parallel.

The rechargeable battery 110 according to the present example embodiment may have a polygonal shape, as shown, or the case may be formed in cylindrical, pouch, or other shapes. The rechargeable battery 110 may include a case 112 and a cap plate 114 connected to an opening of the case 112. The anode terminal 130 and the cathode terminal 140 may protrude outside the case 112.

A vent member 116 (that is opened when the internal pressure increases) and a sealing cap 118 (that seals an electrolyte injection inlet) may be disposed on the cap plate 114.

The terminals 130 and 140 may be fixed to the cap plate 114 while protruding outside the cap plate 114. A gasket 123 for insulating and sealing may be disposed between the cap plate 114 and the terminals 130 and 140, respectively. The anode terminal 130 and the cathode terminal 140 may be formed substantially in a plate shape and may be electrically connected to an electrode assembly (not shown) inserted in the case 112. In an implementation, the anode terminal 130 may be made of aluminum and the cathode terminal 140 may be made of copper.

The rechargeable batteries 110 may be arranged in parallel with each other and may be electrically connected in series by the connecting members 160. For example, as shown in FIG. 1, the anode terminal 130 of rechargeable battery 110-1 and the cathode terminal 140 of adjacent rechargeable battery 110-2 may be alternately disposed, and the connecting member 160 may be welded to the anode terminal 130 of rechargeable battery 110-1 and the cathode terminal 140 of the adjacent rechargeable battery 110-2.

The connecting member 160 may be formed in a plate shape. The connecting member 160 may be disposed on the anode terminal 130 and the cathode terminal 140 to cover the anode terminal 130 and the cathode terminal 140. In this state, the connecting member 160 may be welded to the anode terminal 130 and the cathode terminal 140, e.g., using a general welding operation, and a terminal welded zone 165 may be formed at the connecting member 160.

The connecting member 160 may include a first connecting bar 161 and a second connecting bar 162. The second connecting bar 162 may be bonded to the first connecting bar 161 by friction stir welding. The first connecting bar 161 may be made of aluminum or an aluminum alloy. The anode terminal 130 may also be formed of aluminum or an aluminum alloy. The second connecting bar 162 may be made of copper or a copper alloy. The cathode terminal 140 may also be formed of copper or a copper alloy. The first connecting bar 161 may be fixed to the anode terminal 130 by a general welding operation, and the second connecting bar 162 may be fixed to the cathode terminal 140 by a general welding operation.

The first connecting bar 161 may include a terminal connector 161a welded to the anode terminal 130, a weld protrusion 161c that is thinner than the terminal connector 161a, and a middle step 161b connecting the terminal connector 161a and the weld protrusion 161c.

The terminal connector 161a may be formed in a plate shape, and the middle step 161b (formed at an end of the terminal connector 161a) may be thinner than the terminal connector 161a and thicker than the weld protrusion 161c. The weld protrusion 161c may protrude in a side direction at an end of the middle step 161b. Hence, a step may be formed between the terminal connector 161a and the middle step 161b, and another step may be formed between the middle step 161b and the weld protrusion 161c.

Similar to the first connecting bar 161, the second connecting bar 162 may include a terminal connector 162a, a weld protrusion 162c that is thinner than the terminal connector 162a, and a middle step 162b connecting the terminal connector 162a and the weld protrusion 162c.

The weld protrusion 161c of the first connecting bar 161 and the weld protrusion 162c of the second connecting bar 162 may be disposed so that their ends meet. In this state, the weld protrusions 161c and 162c may be bonded together by friction stir welding. Accordingly, a welded zone 150 may be formed where the weld protrusions 161c and 162c meet. In an implementation, the welded zone 150 may be formed as a point.

Figure 3:
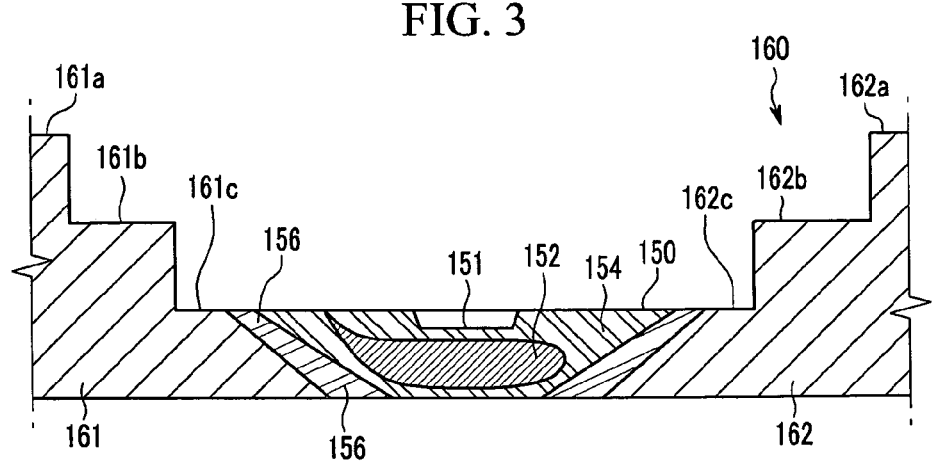
FIG. 3 illustrates a cross-sectional view with respect to a line in FIG. 2.

FIG. 3 illustrates a cross-sectional view with respect to a line in FIG. 2.

Referring to FIG. 3, a friction stir welding operation will be described. With the weld protrusions 161a and 162a overlapping, the welded zone 150 may be formed by rotating a tool to recrystallize the structure using dynamic flow. The tool has a pin and a shank where the pin is fixed, and the cross-section where the pin protrudes from the shank is called a shoulder. The first connecting bar 161 and the second connecting bar 162 may be bonded with a spot shaped weld using the tool, whereby the portion where the shoulder contacts the connecting member 160 is the welded zone 150, and a welded groove 151 is formed at the portion of the welded zone 150 where the pin has been inserted. A nugget 152 that is formed by dynamic recrystallization, a thermo-mechanically affected zone (TMAZ) 154, and a heat affected zone (HAZ) 156 are formed in the welded zone 150.

The nugget 152 is a portion where recovery and recrystallization occur due to high heat and the amount of deformation, such that the nugget 152 is also called a dynamic-recrystallized portion. Unlike general welding, in which melting occurs by heat, the nugget 152 is formed by dynamic recrystallization of a material that is melded in a solid state by friction heat and stirring. The diameter of the nugget 152 is generally larger than the diameter of the pin and smaller than the diameter of the shoulder 183. The size of the nugget 152 is changed by the rotational speed of the tool. For example, when the rotational speed is too high, the size of the nugget 152 may be reduced. When the rotational speed is too high, the shape of the crystal may be incomplete and defects may occur at the incomplete portion.

Materials of the first connecting bar 161 and the second connecting bar 162 may be dynamically recrystallized at the nugget 152. Thus, differing from a generally welded part, the nugget 152 may be organically combined with other materials. Accordingly, cracks may be prevented in the welded zone 150, and electrical power may be transmitted securely in the battery module since the internal resistance is low because of the organic combination.

The thermo-mechanically affected zone 154 is a portion where partial recrystallization occurs by plastic deformation caused by friction at a contact surface where the shoulder of the tool contacts the connecting member 160, and where thermal deformation by friction and mechanical deformation by the shoulder simultaneously occur. Crystals softened by excessive plastic flow and deformation of the material may be distributed at an angle in the thermo-mechanically affected zone 154. Different materials may be bent and mixed with a gradient in the rotation direction in the thermo-mechanically affected zone 154. The different materials are not recrystallized, but are mechanically mixed and thus are not separated. Therefore, the first connecting bar 161 and the second connecting bar 162 may be securely connected.

The heat affected zone 156 is more affected by heat than the thermo-mechanically affected zone 154, in which slanting crystals exist and a plurality of air holes are formed.

The use of friction stir welding may help prevent increases in contact resistance and corrosion between the connecting member 160 and the terminals 130 and 140 in the case that the first connecting bar 161 contacting the anode terminal 130 is made of the same material as the anode terminal 130, and the second connecting bar 162 contacting the cathode terminal 140 is made of the same material as the cathode terminal 140, as in the present example embodiment. Accordingly, not only is the output of the battery module 100 may be improved, and bonding cycle-life of the connecting member 160 and the terminals 130 and 140 may be improved, such that the overall cycle-life of the battery module 100 is improved.

Further, in the connecting member 160, the portion made of the same material as the anode terminal 130 may be welded to the anode terminal 130, and the portion made of the same material as the cathode terminal 140 may be welded to the cathode terminal 140, such that weldability between the connecting member 160 and the terminals 130 and 140 is improved. Further, by bonding the first connecting bar 161 and the second connecting bar 162 using friction stir welding, it may be easier to bond the first connecting bar 161 (made of aluminum or aluminum alloy) and the second connecting bar 162 (made of copper or copper alloy).

Copper and aluminum have different melting points. As such, if they are bonded by resistance welding or ultrasonic welding, then there is a possibility that defects can occur at the welded zone 150, or the welded zone may be separated by external shock or vibration. For example, when a battery module is used in electric vehicles or hybrid electric vehicles, vibration is continuously transmitted to the connecting member 160, and the continuous vibration may cause contact defects between the connecting member 160 and the terminals 130 and 140. In contrast, when the first connecting bar 161 and the second connecting bar 162 are bonded by friction stir welding, as in the present example embodiment, solid-state bonding may be achieved such that the connecting member 160 and the terminals 130 and 140, which have different melting points, can be stably bonded.

The nugget zone 152 (formed at the center of the welded zone 150) is an area where dynamic recrystallization is generated, such that it has a structure that resists external vibration and shock. Further, the thermo-mechanically affected zone 154 (which is an area where the two connecting bars 161 and 162 are rotated and bonded) has mixed parent metals, such it has a structural characteristic that resists external shock and vibration.

Friction stir welding does not need a heat source, a welding rod, and a filler metal, unlike some other welding operations, such that it is an environment friendly welding technique that does not discharge harmful light or substances. Further, since dynamic recombination is generated, it is possible to prevent solidification cracks (which may be formed in fusion bonding), and there is little deformation, such that mechanical properties are excellent.

As the weld protrusions 161c and 162c become thinner, it is easier to weld them and the welding time is reduced. However, when the connecting bars 161 and 162 are thin, their resistance is increased. Increased resistance may be prevented or mitigated by reducing the thickness of the weld protrusions 161c and 162c and increasing the thickness of the terminal connectors 161a and 162a.

Also, the middle steps 161b and 162b (formed between the weld protrusions 161 c and 162c and the terminal connectors 161a and 162a) may help prevent the heat conveyed from the weld protrusions 161c and 162c from being transmitted to the terminal connectors 161a and 162a during welding, and support the strength transmitted to the weld protrusions 161c and 162c. If the thickness of the middle steps 161b and 162b is the same as that of the terminal connectors 161a and 162a, then heat generated by the weld protrusions 161c and 162c may be quickly transmitted to the terminal connectors 161a and 162a so that the material of the terminal connectors 161a and 162a may be damaged. In contrast, heat movement may be reduced by forming the thickness of the middle steps 161b and 162b to be less than that of the terminal connectors 161a and 162a.

Also, strong torque is applied to the weld protrusions 161c and 162c from the tool when friction stir welding. As such, the weld protrusions 161c and 162c can be transformed, e.g., distorted, when the thickness difference between the middle steps 161b and 162b and the terminal connectors 161a and 162a is great or when the weld protrusions 161c and 162c are thin. However, when the middle steps 161b and 162b are formed, the middle steps 161b and 162b support the strength transmitted to the weld protrusions 161c and 162c to prevent the weld protrusions 161c and 162c from being transformed.

Figure 4:
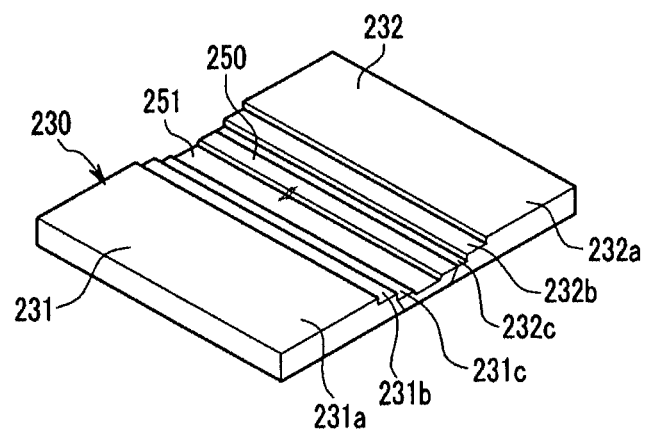
FIG. 4 illustrates a perspective view showing a connecting member of a battery module according to a second example embodiment.

FIG. 4 illustrates a perspective view showing a connecting member 230 according to a second example embodiment.

In the present example embodiment, the connecting member 230 includes a first connecting bar 231 and a second connecting bar 232 attached to the first connecting bar 231 by welding. The first connecting bar 231 and the second connecting bar 232 may be made of different materials. The first connecting bar 231 may be made of the same material as the anode terminal 130, and the second connecting bar 232 may be made of the same material as the cathode terminal 140.

The first connecting bar 231 and the second connecting bar 232 may be formed substantially in a rectangular plate shape. The first connecting bar 231 may include a terminal connector 231a welded to the anode terminal 130, a weld protrusion 231c that is thinner than the terminal connector 231a, and a middle step 231b connecting the terminal connector 231a and the weld protrusion 231c.

The terminal connector 231a may have a plane shape. The middle step 231b may be formed at an end of the terminal connector 231a, and may be thinner than the terminal connector 231a and thicker than the weld protrusion 231c. Also, the weld protrusion 231c may be protruded at an end of the middle step 231b.

Similar to the first connecting bar, the second connecting bar 232 may include a terminal connector 232a, a weld protrusion 232c that is thinner than the terminal connector 232a, and a middle step 232b connecting the terminal connector 232a and the weld protrusion 232c.

The weld protrusion 231c of the first connecting bar 231 and the weld protrusion 232c of the second connecting bar 232 may be disposed to meet each other. In this state, a tool for friction stir welding may be placed on the boundary of the first connecting bar 231 and the second connecting bar 232 to fix the first connecting bar 231 and the second connecting bar 232 together by friction stir welding. The tool may perform the welding operation while moving along the boundary of the first connecting bar 231 and the second connecting bar 232, such that a welded zone 250 has a line form. A welded groove 251, into which a pin of the tool is inserted, may be formed in the center of the welded zone 250.

According to the present example embodiment, the welded zone 250 may be formed to be a line. Thus, the welded zone 250 may have a wide welded part to more stably fix the first connecting bar 231 and the second connecting bar 232.

Figure 5:
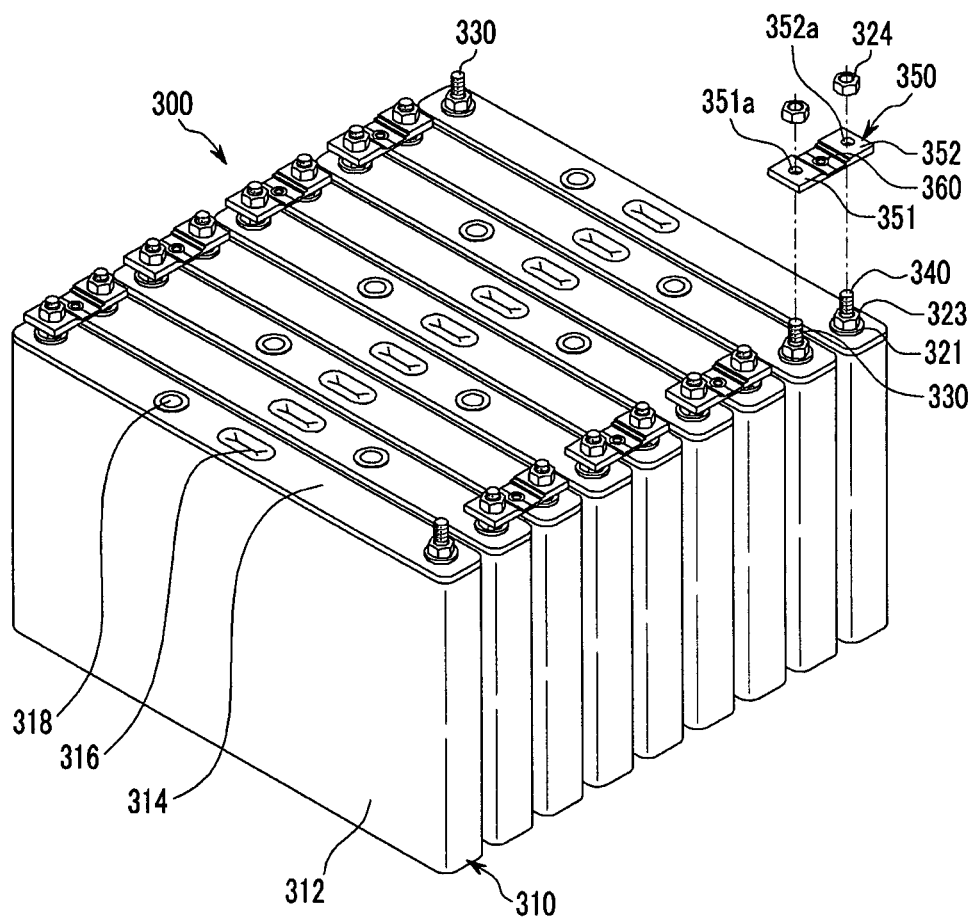
FIG. 5 illustrates a perspective view showing a connecting member of a battery module according to a third example embodiment.

FIG. 5 illustrates a perspective view showing a connecting member of a battery module 300 according to a third example embodiment.

Referring to FIG. 5, the battery module 300 according to the present example embodiment may include a plurality of rechargeable batteries 310. The rechargeable batteries may each have an anode terminal 330 and a cathode terminal 340. Connecting members 350 may electrically connect the rechargeable batteries 310. In an implementation, the rechargeable batteries 310 in the battery module 300 may be electrically connected in series.

The rechargeable battery 310 according to the present example embodiment may be formed in a polygonal shape. The rechargeable battery 310 may include a case 312 and a cap plate 314 connected to an opening of the case 312. The anode terminal 330 and the cathode terminal 340 may protrude outside the case 312. A vent member 316 (that is opened when the internal pressure increases) and a sealing cap 318 (that seals an electrolyte injection inlet) may be disposed on the cap plate 314.

The terminals 330 and 340 may be disposed on the cap plate 314 to protrude outside the cap plate 314. Lower nuts 323, supporting the terminals 330 and 340 on the cap plate 314, may be fitted on the terminals 330 and 340. A gasket 321 for insulation may be disposed between each lower nut 323 and the cap plate 314.

The anode terminal 330 and the cathode terminal may be formed substantially in a cylindrical shape, and the outer circumferential surfaces may be threaded to fit nuts. The anode terminal 330 and the cathode terminal 340 may be electrically connected to an electrode assembly inserted in the case 312. The anode terminal 330 may be made of, e.g., aluminum or aluminum alloy, and the cathode terminal 340 may be made of, e.g., copper or copper alloy.

The connecting member 350 may be disposed on the lower nut 323. The connecting member 350 may include a first connecting bar 351 contacting the anode terminal 330 and a second connecting bar 352 contacting the cathode terminal 340. The first connecting bar 351 may be made of the same material as the anode terminal 330, and the second connecting bar 352 may be made of the same material as the cathode terminal 340.

The first connecting bar 351 may include a terminal connector (at which a terminal hole 351a, into which the anode terminal 330 is inserted, is formed), a weld protrusion that is thinner than the terminal connector, and a middle step connecting the terminal connector and the weld protrusion.

The second connecting bar 352 may include a terminal connector (at which a terminal hole 352a, in which the cathode terminal 340 is inserted, is formed), a weld protrusion that is thinner than the terminal connector, and a middle step connecting the terminal connector and the weld protrusion.

The connecting member 350 may be fixed to the terminals 330 and 340 by inserting the anode terminal 330 and the cathode terminal 340 into the terminal holes 351a and 352a, respectively, and then fitting upper nuts 324 on the terminals 330 and 340.

While the weld protrusions are disposed to meet each other, the first connecting bar 351 and the second connecting bar 352 may be bonded by friction stir welding, and a welded zone 360 may be formed at a part where the first connecting bar 351 and the second connecting bar 352 meet. The welded zone 360 may be formed to be a spot, a line, etc.

In the connecting member 350, the portion contacting the anode terminal 330 may be made of the same material as the anode terminal 330, and the portion contacting the cathode terminal 340 may be made of the same material as the cathode terminal 340. Thus, it may be possible to prevent corrosion between the connecting member 350 and the terminals 330 and 340. The first connecting bar 351 and the second connecting bar 352 may be bonded by friction stir welding. Thus, it may be possible to stably fix different metals to one another.

Figure 6:
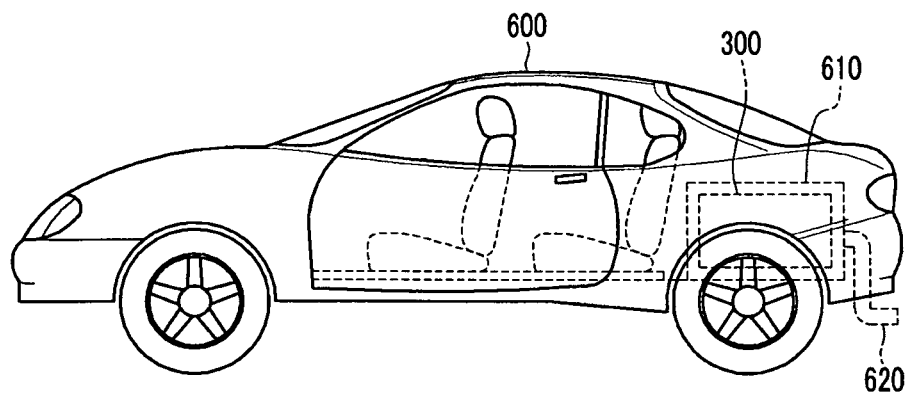
FIG. 6 illustrates a vehicle including an air-cooled battery pack according to a fourth example embodiment.

FIG. 6 illustrates a vehicle 600 including the battery module 300 according to a fourth example embodiment. The battery module 100 may be similarly used. In an implementation, the vehicle 600 may be an electric vehicle or a hybrid vehicle, e.g., a plug-in electric car, motorcycle, bicycle, scooter, etc., a gas- or diesel-electric hybrid car, motorcycle, bicycle, scooter, etc., and the like, whether carrying passengers or cargo/equipment, and whether human controlled, automated, robotic, etc. The electric vehicle may use an electric engine that is powered by electrical energy output from a battery. The electric vehicle may use a battery module according to an embodiment to provide power, e.g., as a main power source and/or a backup power source. The hybrid vehicle may use two or more kinds of power sources, for example, an internal combustion engine and an electric motor, to provide motive power. In another implementation, the internal combustion engine may be used only to generate electricity. In another implementation, a fuel cell, e.g., a hydrogen-powered fuel cell, may be used to generate electricity.

In an embodiment, the vehicle 600 may include a power source, the power source providing a motive power for the vehicle, and the battery module 300 according to an embodiment, the battery module 300 being configured to provide electricity to the power source. In an implementation, the battery module 300 may be housed in a case 610. The case 610 may be coupled with an inlet or outlet 620 to communicate with the ambient atmosphere.

As described above, embodiments relate to a battery module in which the structure for electrically connecting rechargeable batteries is improved. The battery module may be, e.g., a high power battery module using a high energy density non-aqueous electrolyte. The battery module may include a plurality of rechargeable batteries connected in series.

The rechargeable battery may be formed in, e.g., a cylindrical shape or a polygonal shape. The polygonal rechargeable battery may include a case having an electrode assembly in which an anode and a cathode are disposed with a separator therebetween, and a space where the electrode assembly is disposed, a cap plate sealing the case and having a terminal hole where an electrode terminal is inserted, and an electrode terminal that is electrically connected with the electrode assembly and protrudes outside the case through the terminal hole.

In a general battery module, an electrode terminal may be fixed to a cap plate by a nut. However, the nut may be loosened by continuous external vibration or shock, and the loosened nut may cause an increase in contact resistance inside the rechargeable batteries, such that the output and cycle-life of the rechargeable batteries are reduced. Also, in the case that an anode terminal is made of aluminum and a cathode terminal is made of copper, corrosion may be generated or contact resistance may be continuously increased by contact between the different metals. A method of connecting a connecting member to the anode and the cathode using resistance welding might be used in an effort to overcome such drawbacks, but when the connecting member is made of a different material from that of the anode terminal or the cathode terminal, it may be difficult to bond the connecting member and the terminals using general welding operations such as resistance welding or ultrasonic welding because of different melting points.

In contrast, as described above, embodiments may provide a battery module having a stable connection between a connecting member and terminals, thereby maintaining low contact resistance. The contact resistance between the terminal and the connecting member may be reduced, thereby improving output and life of the battery module, and corrosion may be reduced to increase the life of the battery module. A battery module according to an embodiment may include a plurality of rechargeable batteries having an anode terminal and a cathode terminal configured to minimize contact resistance. The battery module may be configured with a connecting member for electrically connecting the rechargeable batteries, and including a first connecting bar and a second connecting bar fixed to the first connecting bar by welding. The first connecting bar and the second connecting bar may be made of different materials, and may have a welded zone formed, at a part where the first connecting bar and the second connecting bar meet, by friction stir welding.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery module, comprising:
a first battery having a first terminal, the first terminal including a first metal;
a second battery having a second terminal, the second terminal including a second metal different from the first metal; and
a connecting member electrically connecting the first terminal to the second terminal, the connecting member having a first portion and a second portion, a face of the first portion being joined to a face of the second portion, a nugget zone being disposed where the face of the first portion meets the face of the second portion, the first portion including a third metal, the second portion including a fourth metal, and the fourth metal being different from the third metal, wherein each of the first and second portions of the connecting member includes a first section having a first thickness, a second section having a second thickness different from the first thickness, and a third section having a third thickness different from the second thickness, and wherein the nugget zone is located between the first and second sections of the first portion and the first and second sections of the second portion of the connecting member.

2. The battery as claimed in claim 1, wherein the face of the first portion and the face of the second portion are joined together with a friction stir weld.

3. The battery as claimed in claim 1, wherein the face of the first portion and the face of the second portion extend in a thickness direction of the connecting member.

4. The battery as claimed in claim 1, wherein the face of the first portion and the face of the second portion are joined in a butt joint.

5. The battery module as claimed in claim 1, wherein a weld zone is present where the first and second portions are joined together, the weld zone including the nugget zone, a thermo-mechanically affected zone, and a heat affected zone.

6. The battery module as claimed in claim 5, wherein the weld zone is a spot.

7. The battery module as claimed in claim 5, wherein the weld zone is linear.

8. The battery module as claimed in claim 1, wherein:
the first portion is fixed to the first terminal,
the first metal is aluminum or an aluminum alloy,
the second metal is copper or a copper alloy,
the third metal is aluminum or an aluminum alloy, and
the fourth metal is copper or a copper alloy.

9. The battery module as claimed in claim 1, wherein the first portion is welded to the first terminal.

10. The battery module as claimed in claim 1, wherein the first portion is attached to the first terminal with a fixing member.

11. The battery module as claimed in claim 10, wherein the fixing member is a nut.

12. The battery module as claimed in claim 1, wherein:
the first portion includes:
a first terminal connector that corresponds to the first section;
a first middle step that corresponds to the second section; and
a first weld protrusion that corresponds to the third section, the first middle step being between the first terminal connector and the first weld protrusion,
the second portion includes:
a second terminal connector that corresponds to the first section;
a second middle step that corresponds to the second section; and
a second weld protrusion that corresponds to the third section, the second middle step being between the second terminal connector and the second weld protrusion, and the first weld protrusion and the second weld protrusion are joined together.

13. The battery module as claimed in claim 12, wherein:
the first middle step has a thickness greater than that of the first weld protrusion and less than that of the first terminal connector, and
the second middle step has a thickness greater than that of the second weld protrusion and less than that of the second terminal connector.

14. The battery module as claimed in claim 12, wherein the first terminal connector is welded to the first terminal.

15. The battery module as claimed in claim 12, wherein:
the first terminal connector has a first hole penetrating therethrough,
the second terminal connector has a second hole penetrating therethrough,
the first terminal protrudes through the first hole, and the first terminal connector is attached to the first terminal with a fixing member.

16. The battery module as claimed in claim 15, wherein the fixing member is a nut.

17. A vehicle, comprising:
a power source, the power source providing a motive power for the vehicle; and
a battery module configured to provide electricity to the power source, the battery module including:
a first battery having a first terminal, the first terminal including a first metal;
a second battery having a second terminal, the second terminal including a second metal different from the first metal; and
a connecting member electrically connecting the first terminal to the second terminal, the connecting member having a first portion and a second portion, a face of the first portion being joined to a face of the second portion, a nugget zone being disposed where the face of the first portion meets the face of the second portion, the first portion including a third metal, the second portion including a fourth metal, and the fourth metal being different from the third metal, wherein each of the first and second portions of the connecting member includes a first section having a first thickness, a second section having a second thickness different from the first thickness, and a third section having a third thickness different from the second thickness, and wherein the nugget zone is located between the first and second sections of the first portion and the first and second sections of the second portion of the connecting member.

18. The battery module as claimed in claim 1, wherein the third sections are between the first and second sections of the first and second portions of the connecting member.

19. The battery module as claimed in claim 18, wherein the first thickness is greater than the second thickness, and wherein the second thickness is greater than the third thickness.

20. The battery module as claimed in claim 18, wherein:
the nugget zone is in a shape of a line,
the first and second portions have fourth sections between the third sections, and
each of the fourth sections have a fourth thickness less than the third thickness.

21. The battery module as claimed in claim 18, wherein:
the first section of the first portion of the connecting member is electrically connected to the first terminal, and
the first section of the second portion of the connecting member is electrically connected to the second terminal.

22. The battery module as claimed in claim 18, wherein:
the nugget zone has a first width, and
the second section has a second width different from the first width.

23. The battery module as claimed in claim 22, wherein the first width is greater than the second width.

24. The battery module as claimed in claim 22, wherein:
the third section has a third width, and
the third width is greater than the second width.

* * * * *